United States Patent
Beigel

(10) Patent No.: US 6,364,389 B1
(45) Date of Patent: Apr. 2, 2002

(54) STOWABLE INTERIOR DIVIDER FOR TRUCK CABS

(75) Inventor: David J. Beigel, Kettering, OH (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/693,461

(22) Filed: Oct. 19, 2000

Related U.S. Application Data

(60) Provisional application No. 60/160,962, filed on Oct. 22, 1999, and provisional application No. 60/166,291, filed on Nov. 18, 1999.

(51) Int. Cl.$^7$ ................................................. B60P 9/00
(52) U.S. Cl. .................. 296/24.1; 296/83; 296/141; 296/142; 296/143; 296/138; 160/238; 160/241; 160/266; 160/290.1
(58) Field of Search .................... 296/24.1, 83, 135, 296/138, 141, 142, 143; 160/290.1, 238, 241, 266

(56) References Cited

U.S. PATENT DOCUMENTS

| | | | | |
|---|---|---|---|---|
| 4,694,819 A | * | 9/1987 | Shaffer | 126/140 |
| 4,825,921 A | * | 5/1989 | Rigter | 160/23.1 |
| 5,069,497 A | * | 12/1991 | Clelland | 296/24.1 |
| 5,238,282 A | * | 8/1993 | Watson et al. | 296/24.1 |
| 5,345,991 A | * | 9/1994 | Huber et al. | 160/241 |
| 5,505,244 A | * | 4/1996 | Thumann | 160/290.1 X |
| 5,662,373 A | * | 9/1997 | Hanemaayer | 296/164 |
| 5,680,893 A | * | 10/1997 | Neer | 160/330 |
| 6,082,432 A | * | 7/2000 | Kissinger | 160/290.1 |

* cited by examiner

*Primary Examiner*—Stephen T. Gordon
*Assistant Examiner*—Lori L Coletta
(74) *Attorney, Agent, or Firm*—Jeffrey P. Calfa; Neil T. Powell; Dennis Kelly Sullivan

(57) ABSTRACT

A stowable partition assembly for a truck cab provides privacy for an interior sleeping area mounted aft of the operator space. The assembly has an overhead track depending from the cab ceiling, oriented to define a border between the forward operator area and the aft interior sleeping area. A pair of curtains are hung from their upper edges from the overhead track and are positionable on the track to divide the aft living space from the forward operator space when extended. A pair of stowage compartments are located at each end of the track along the interior sides of the truck cab to receive the curtain when retracted. Retraction of the curtains is provided by roll up retractors disposed in each stowage compartment. The curtains are each attached along one of two vertical edges to the roll up retractor to be wound thereon. An interlocking latch provides closure of the curtains when pulled from the stowage compartments. The interlocking latch comprises two interlocking strips, one being attached along the remaining free vertical edge of each curtain.

6 Claims, 7 Drawing Sheets

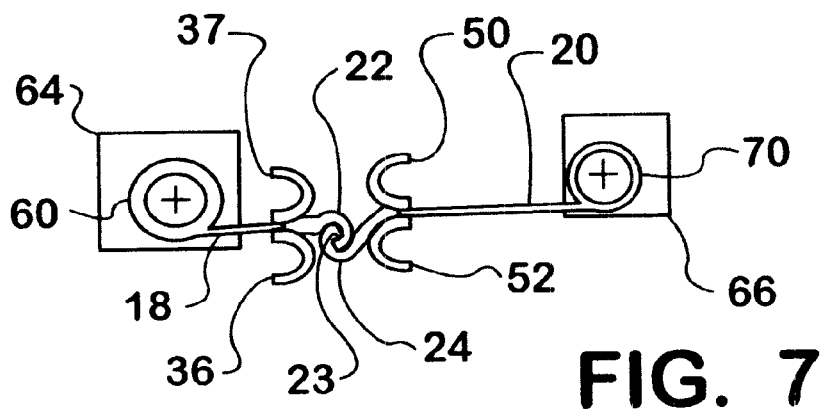
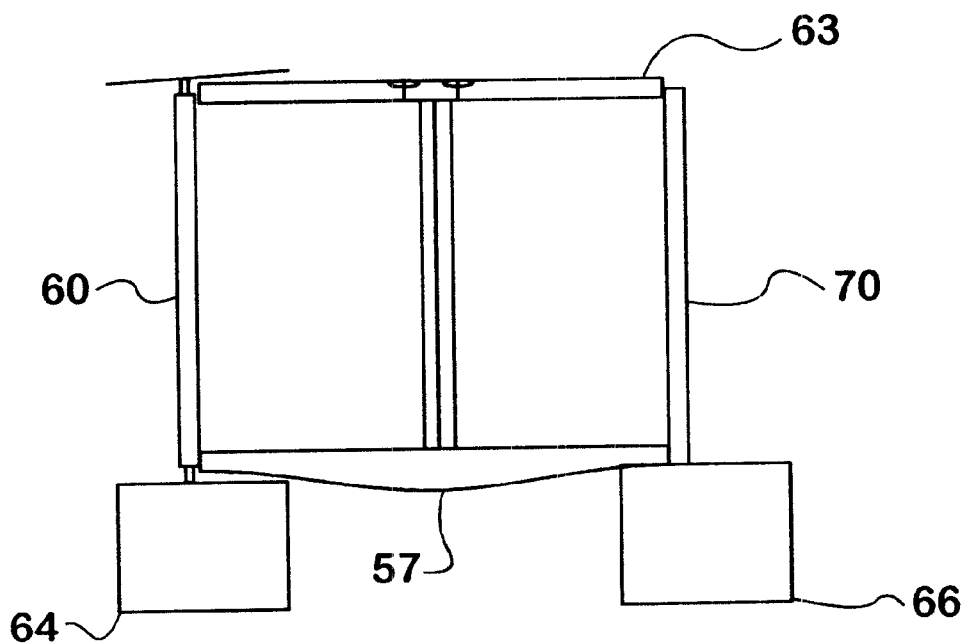

STOWABLE INTERIOR DIVIDER FOR TRUCK CABS

REFERENCE TO RELATED APPLICATION

The present patent is related to provisional applications Ser. No. 60/160,962 filed Oct. 22, 1999; and Ser. No. 60/166,291, filed Nov. 18, 1999 to David J. Beigel.

FIELD OF THE INVENTION

The present invention relates generally to space dividers installable on vehicles and more particularly to a stowable curtain divider for partitioning an operating area from living quarters, particularly in a truck cab.

BACKGROUND OF THE INVENTION

Truck cabs, including extended cabs, have limited interior space to accommodate driver, passengers, luggage and sleeping quarters. The tight quarters limit privacy, even in the sleeping compartments now provided in many long haul trucks. While these compartments enhance the comfort of the drivers and any passengers, the possibility for disturbing the driver or passengers still exist. Curtains have been hung in vehicles between the two spaces in the cab, but these clutter the vehicle's interior space. Such dividers should use minimal space and not clutter the area when not in use.

SUMMARY OF THE INVENTION

According to the invention there is provided a stowable partition assembly for a truck cab, providing privacy for an interior sleeping area mounted aft of the operator space. The assembly has an overhead track depending from the cab ceiling, oriented to define a border between the forward operator area and the aft interior sleeping area. A pair of curtains are hung from their upper edges from the overhead track and are positionable on the track to divide the aft living space from the forward operator space when extended. A pair of stowage compartments are located at each end of the track along the interior sides of the truck cab to receive the curtain when retracted. Retraction of the curtains is provided by roll up retractors disposed in each stowage compartment. The curtains are each attached along one of two vertical edges to the roll up retractor to be wound thereon. An interlocking latch provides closure of the curtains when pulled from the stowage compartments. The interlocking latch comprises two interlocking strips, one being attached along the remaining free vertical edge of each curtain.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is a top view schematic of the partition assembly.

FIG. 8 is a back view schematic of the partition assembly.

DETAILED DESCRIPTION OF THE INVENTION

Figure 1A:
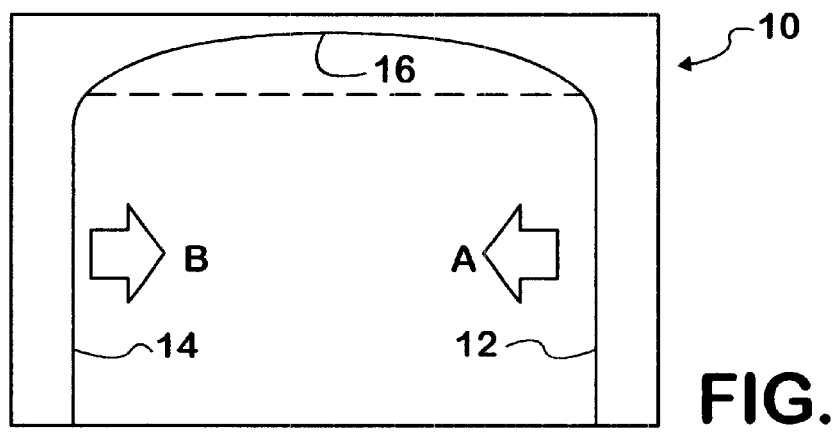
FIGS. 1A–C are front schematics of a stowable curtain partition for a truck cab in accordance with the invention.
Figure 1B:
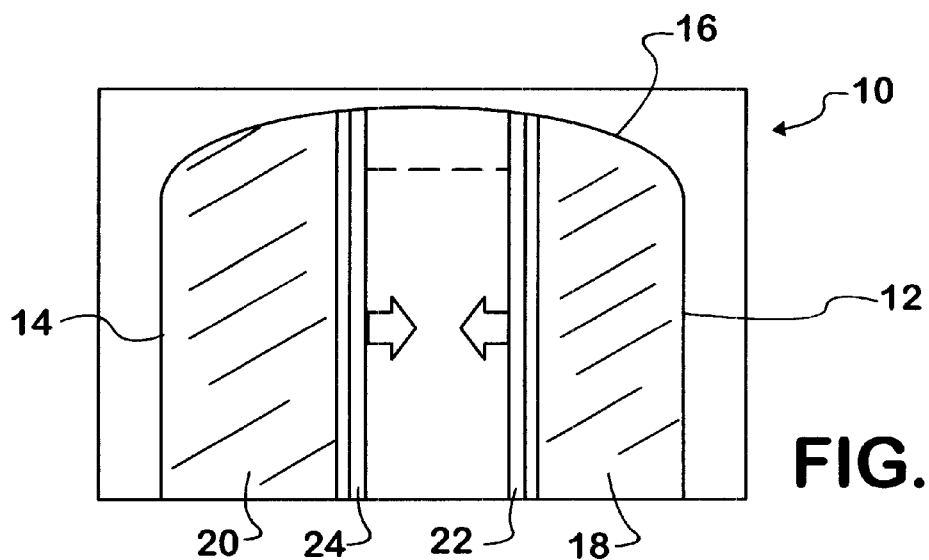
Figure 1C:
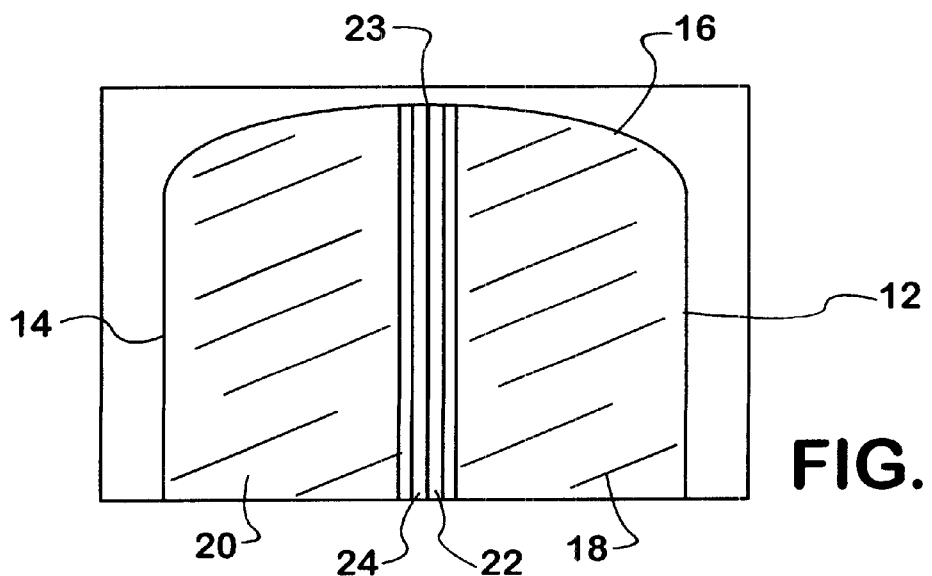

Referring now to the drawings and particularly to FIGS. 1A–C, a stowable partition assembly 10 for a truck cab is illustrated. Partition assembly 10 is built primarily into the interior sidewalls 12 and 14 of the cab, but includes a guide track 16 suspended from the cab ceiling extending toward the middle of the cab interior. Partition assembly 10 includes a pair of curtains 18 and 20, which may be pulled from stowage compartments in each sidewall in the directions indicated by letters A and B. Curtains 18 and 20 may be extended out sufficiently to allow the curtains to be attached to one another using a linking mechanism made up of linking strips 22 and 24. Linking strips 22 and 24 run the vertical length of the sides of curtains 18 and 20. Bringing curtains 18 and 20 proximate to one another by full extension of the curtains from the stowage compartments allows linking strips 22 and 24 to be hooked to one another to form an interlocking latch 23.

Figure 2:
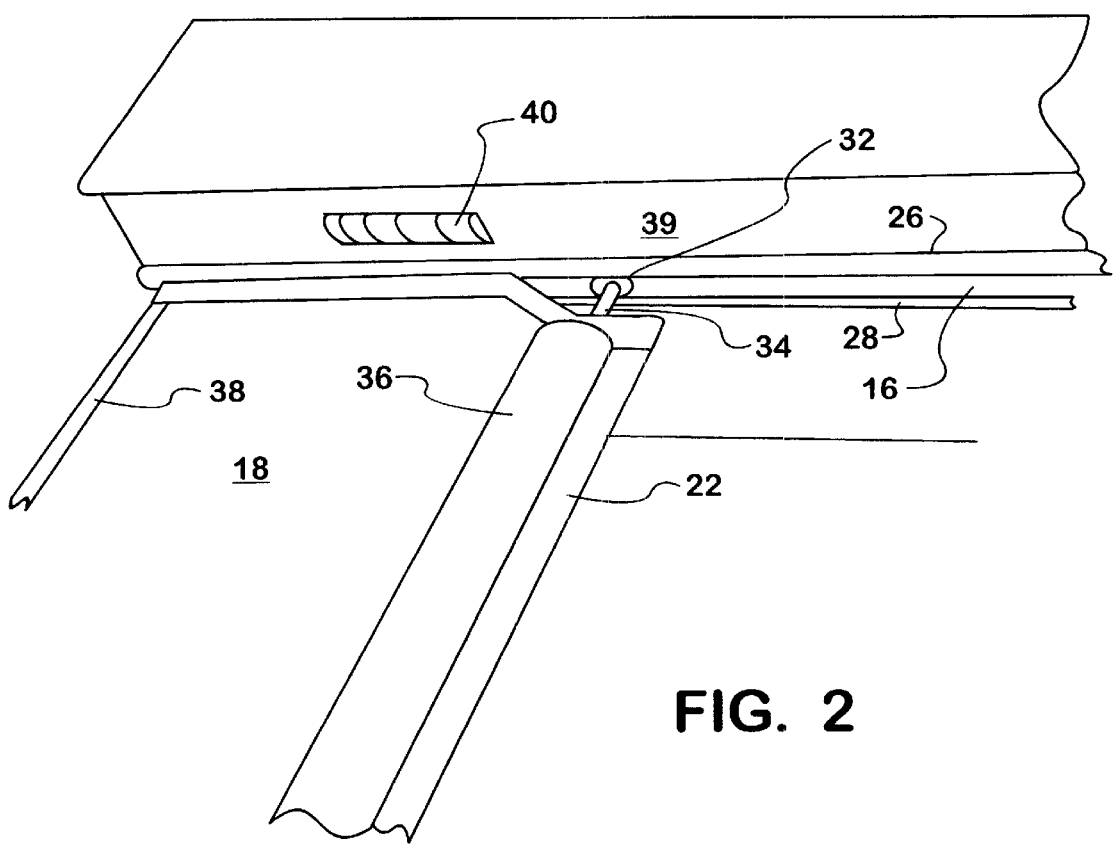
FIG. 2 is a partial perspective view of one stowable curtain used in the partition.

FIG. 2 illustrates curtain 18 partially extracted from a driver's side stowage compartment 38 along a driver's side sidewall 12 as viewed from a sleeping compartment. Guide track 16 is mounted from a ceiling 39 and is formed from two cooperating rails 26 and 28. A lamp 40 and other accessories may also be built into ceiling 39. Curtain 18 is suspended from track 16 by a guide wheel 32 and axle assembly 34 extending upwardly from an end strip assembly on curtain 18 comprising a interlinking strip 22 and a handle 36. Wheel 32 is retained within track 16 by rails 26 and 28.

Figure 3:
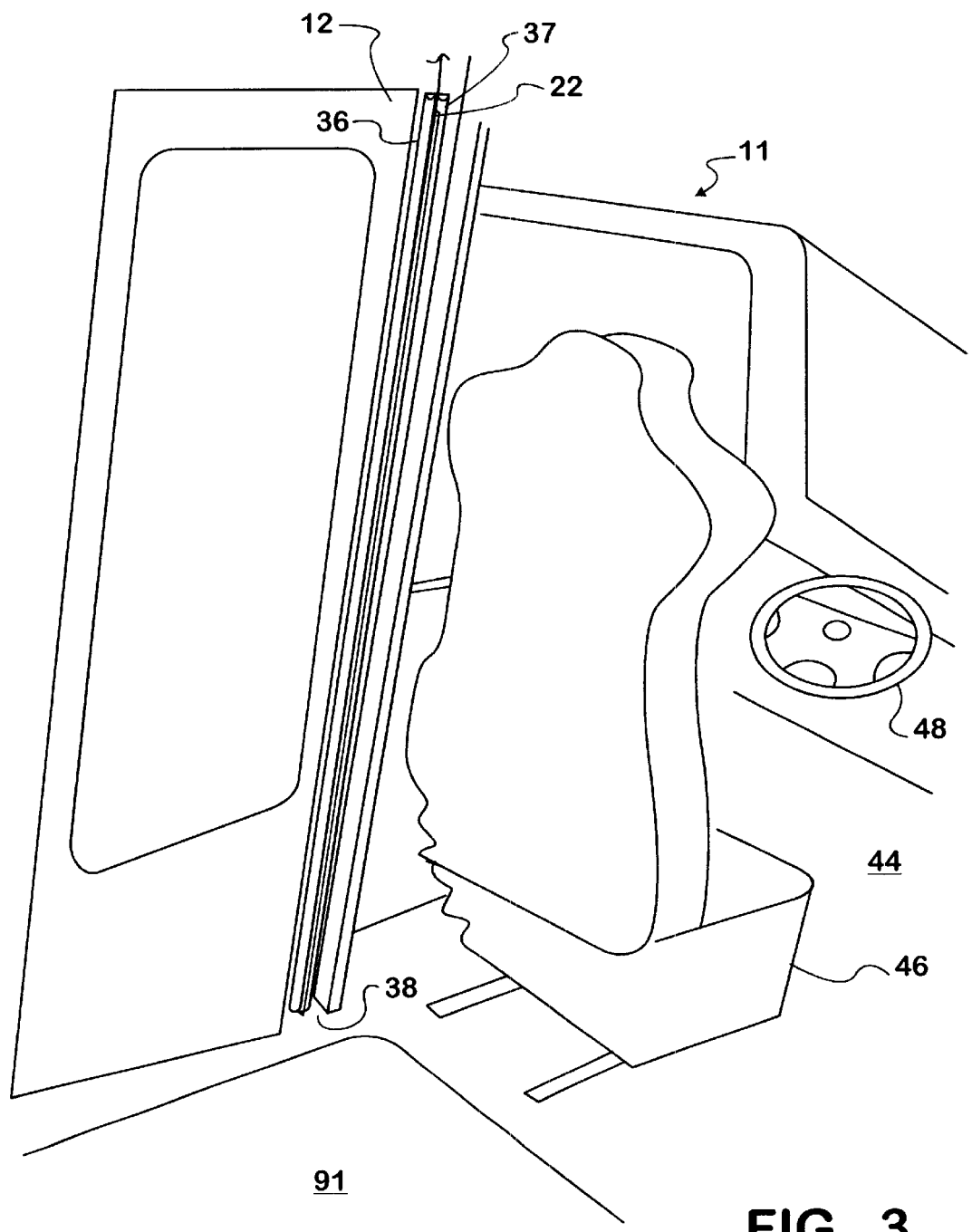
FIG. 3 is a perspective view of a stowage compartment for a curtain disposed in a wall along the driver's side of the vehicle.

FIG. 3 illustrates curtain 18 fully stowed in compartment 38. Stowage compartment 38 is disposed in sidewall 12 between a sleeping area 91 and an operator's space 44 of a cab 11. The relative position of a driver's seat 46 and steering wheel 48 to the stowage compartment 38 is depicted. Of curtain 18, essentially only handles 36 and 37, and interlinking strip 22 are accessible.

Figure 4:
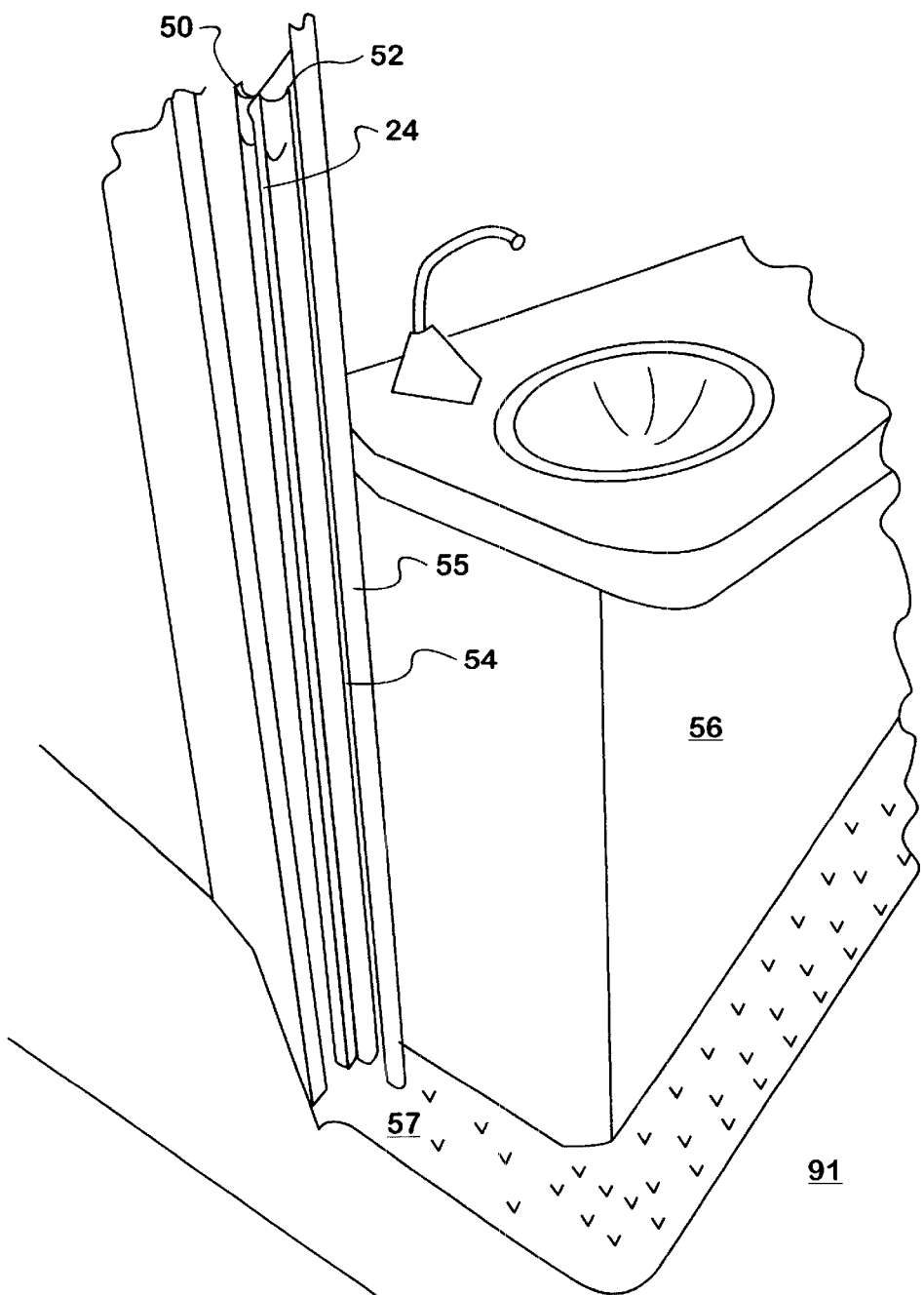
FIG. 4 is a perspective view of a stowage compartment for a curtain disposed in a wall along the passenger's side of the vehicle.

In FIG. 4 passenger side stowage compartment 54 formed in sidewall 55 is shown. Similar to the driver's side, with curtain 20 fully stowed, and handles 50 and 52, and an interlinking strip 24 are shown. Sidewall 55 comprises various elements including a sleeping area vanity 56 resting on a floor 57. Stowage compartment 54 runs vertically from floor 57 to the ceiling 63 or to another anchor point for the roller.

Figure 5:
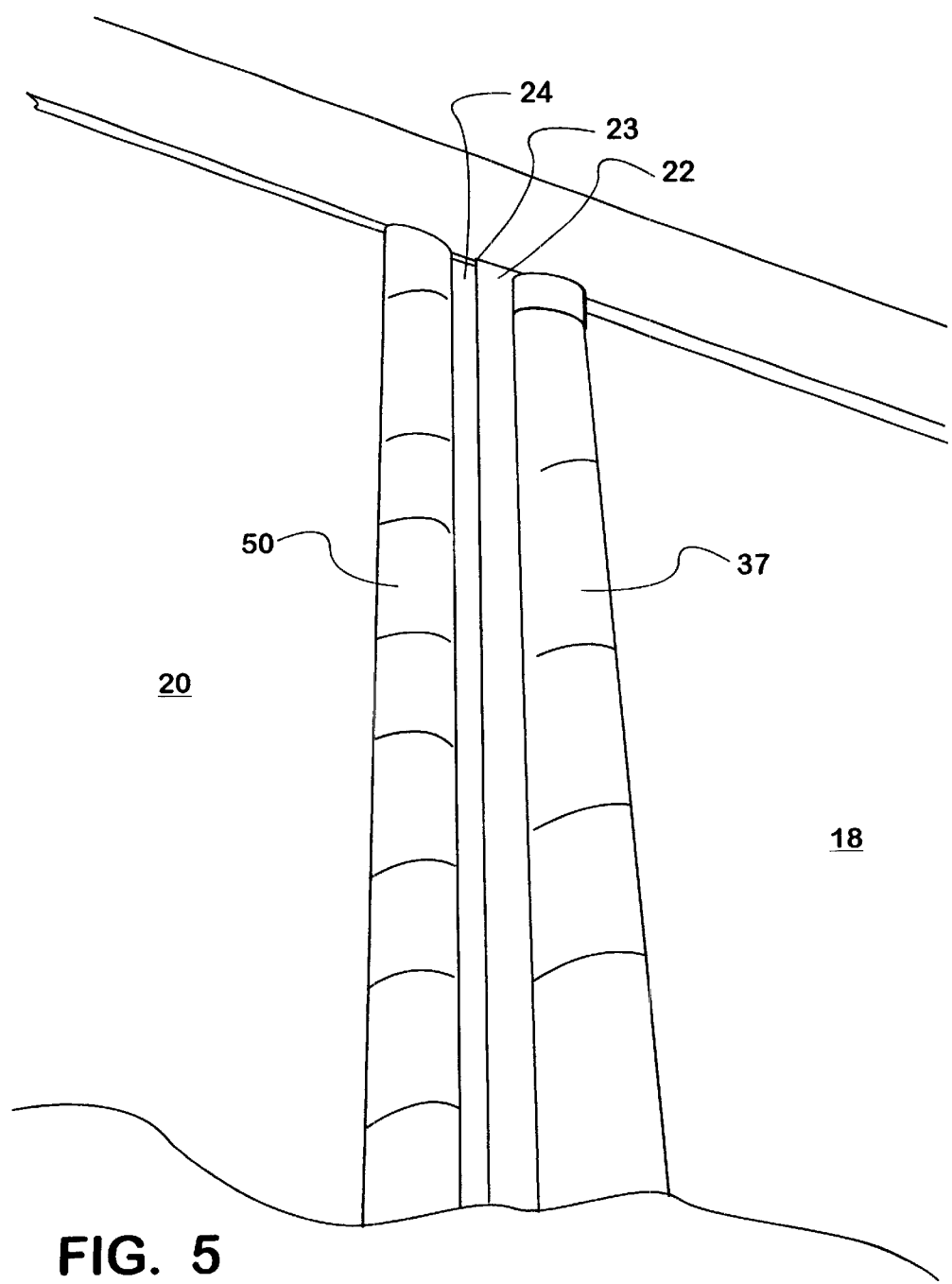
FIG. 5 illustrates the curtains closed on one another to partition an aft sleeping compartment from the front operator's space.

In FIG. 5, curtains 18 and 20 have been fully extracted from stowage compartments and brought proximate to one another along vertical edges, allowing interlinking strips 22 and 24 to be connected, closing the curtains and completing partition of the truck cab sleeping area from the operator area. Interlinking strips 22 and 24 are held in snug engagement by the tension applied to spring biased retraction mechanisms, as described below. Curtains 18 and 20 may be further pulled toward one another to allow release of the interlinking strips and retraction of the curtains back into stowage.

Figure 6:
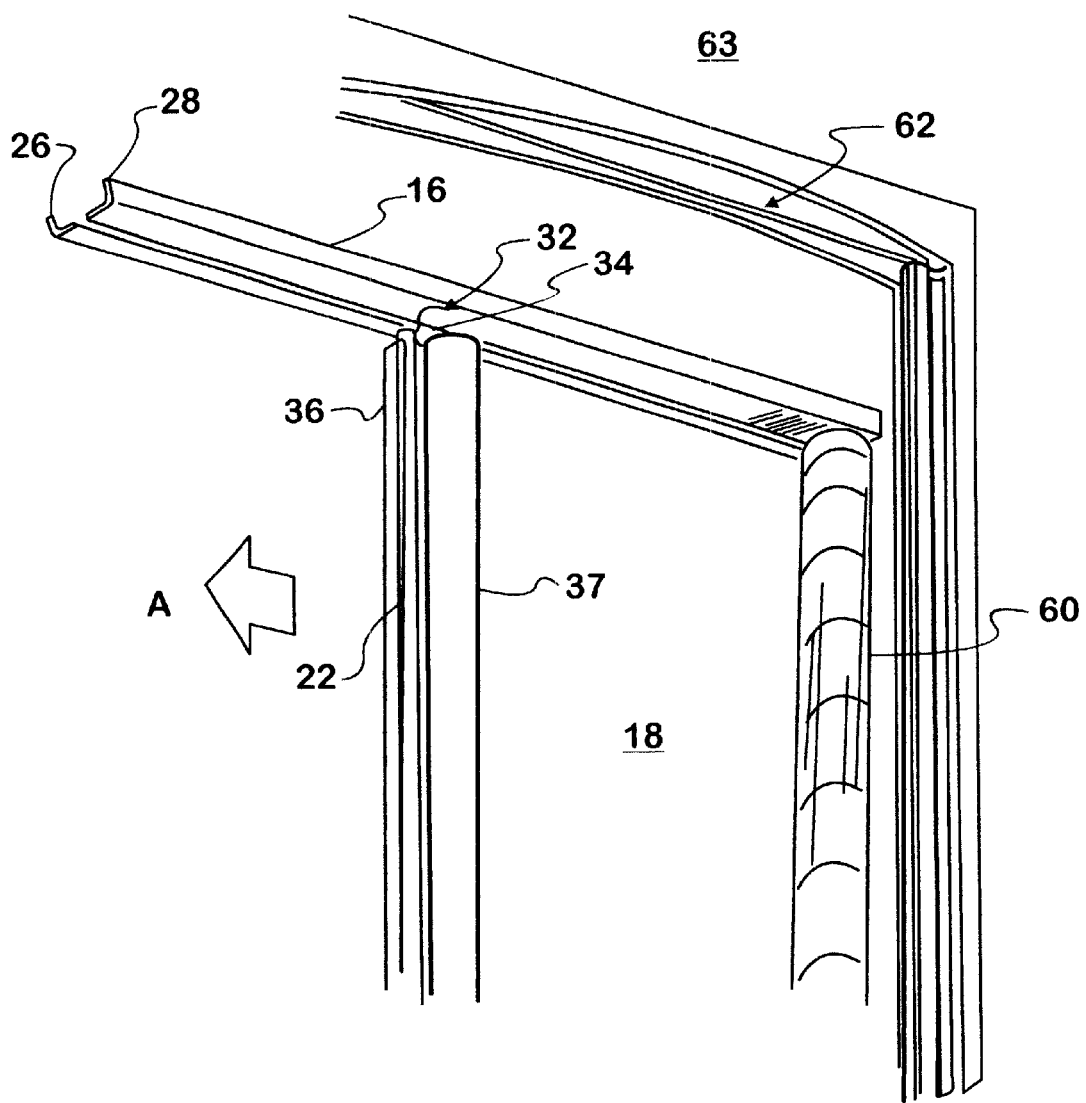
FIG. 6 is a detailed perspective view of a curtain suspension and roll up mechanism.

FIG. 6 is a more detailed view of one of the two curtains used in the preferred embodiment of the invention, in partial cutaway. The description is applicable to both curtains, where present. In some embodiments, only one curtain may be used, by widening the curtain to allow in to be pulled completely across the opening between the operator area and the sleeping area. Track 16 is constructed from two rails 26 and 28, which are generally L-shaped and are positioned parallel to one another to form a narrow channel through which axle 34 passes. Track 16 is supported on a suspension 62 attached to the ceiling 63 of the cab. Guide wheel 32 is positioned above proximate arms of the rails. Curtain 18 is attached along one vertical edge, and rolled onto, a roller 60 which is positioned within stowage compartment 38. Handles 36 and 37 prevent curtain 18 from being completely rolled onto roller 60. Curtain 18 may be unrolled from roller 60 in the direction indicated by the letter A.

As illustrated in FIG. 7, interlinking strips 22 and 24 are C-shaped hooks, one oriented to be open toward the front of the cab and the second oppositely directed. Interlinking strips 22 and 24 may be brought into positions proximate one another, with the hooks overlapping one another using handles 36 and 37, or handles 50 and 52 to pull curtains 18 and 20 toward one another. Overlapped, the strips 22 and 24 retain the curtains 18 and 20 against retraction. The handles, 36 and 37 with respect to curtain 18, and 50 and 52 with respect to curtain 20 are attached to a vertical edge of the curtains adjacent and parallel to the interlocking strips 22 and 24. Curtains 18 and 20 are unrolled from rollers 60 and 70 which are mounted in spring loaded retraction mechanisms 64 and 66. The direction of roll is selected to result in a bias toward rewinding curtains 18 and 20 on rollers 60 and 70, respectively. Rollers 60 and 70, as shown in FIG. 8, are set between the floor 57 and the ceiling 63.

The partition assembly meets the need for a space partition by positioning retraction mechanisms in walls alongside the livable space and providing for the complete retraction of curtains into the those compartments. While the invention is shown in only one of its forms, it is not thus limited but is susceptible to various changes and modifications without departing from the spirit and scope of the invention. The invention is not limited to the specific details, application, representative devices, and illustrated examples in this description.

What is claimed is:

1. A vehicle cab comprising:

a ceiling;

interior spaced sides:

a forward operator space;

an aft living space; and a stowable partition for dividing the forward operator space from the aft living space, the stowable partition having, an overhead track depending from the ceiling, the overhead track being positioned and latitudinally oriented to define a border between the forward operator area and the aft living area;

a first curtain hung from an upper edge of the overhead track and positionable on the track to divide the aft living space from the forward operator space when extended;

a first stowage compartment located in one of the spaced interior sides;

a first roll up retractor in the first stowage compartment the first curtain being attached along one of two vertical edges to the first roll up retractor to be wound thereon; and an interlocking latch having first and second interlocking strips, the first interlocking strip being attached to a free vertical edge of the curtain and the second interlocking strip being positionable along the border between the aft living space and the forward operator space and spaced from the first stowage compartment.

2. A vehicle cab as claimed in claim 1 wherein the stowable partition assembly further comprises:

a second curtain hung from an upper edge of the overhead track and positionable on the track to divide the aft living space from the forward operator space when extended;

a second stowage compartment in a spaced interior side opposite the first stowage compartment;

a second roll up retractor in the second stowage compartment, the second curtain being attached along one of two vertical edges to the second roll up retractor to be wound thereon; and the second interlocking strip being attached to a free vertical edge of the second curtain to be positioned along the border between the aft living space and the forward operator space to be joined with the first interlocking strip.

3. A vehicle cab as claimed in claim 2, wherein the first and second roll up retractors include spring biased curtain retraction mechanisms.

4. A vehicle cab as claimed in claim 3, the stowable partition assembly further comprising:

forward and aft facing grab handles on each curtain adjacent the first and second interlocking strips.

5. A divider curtain assembly for a truck cab, the divider curtain assembly comprising:

an overhead track having two ends;

a pair of opposed, spaced compartments at the ends of the overhead track;

a pair of rollers, one vertically mounted in each of the pair of opposed, spaced compartments;

first and second curtains suspended from the overhead track for positioning, with each curtain being attached along one vertical edge to one of the pair of rollers;

a pair of spring mechanisms, one coupled to each of the pair of rollers, biasing the roller to furl the curtain attached to that roller; and an interlocking strip attached along a free vertical edge of each curtain.

6. The divider curtain assembly of claim 5, further comprising:

forward and aft facing grab handles on each curtain adjacent the interlocking strips along free vertical edges of each curtain.

\* \* \* \* \*